Oct. 29, 1963  E. F. ROWEKAMP  3,108,835
EXTERNALLY GRIPPING ARTICLE TRANSFERRING APPARATUS
Filed March 29, 1962
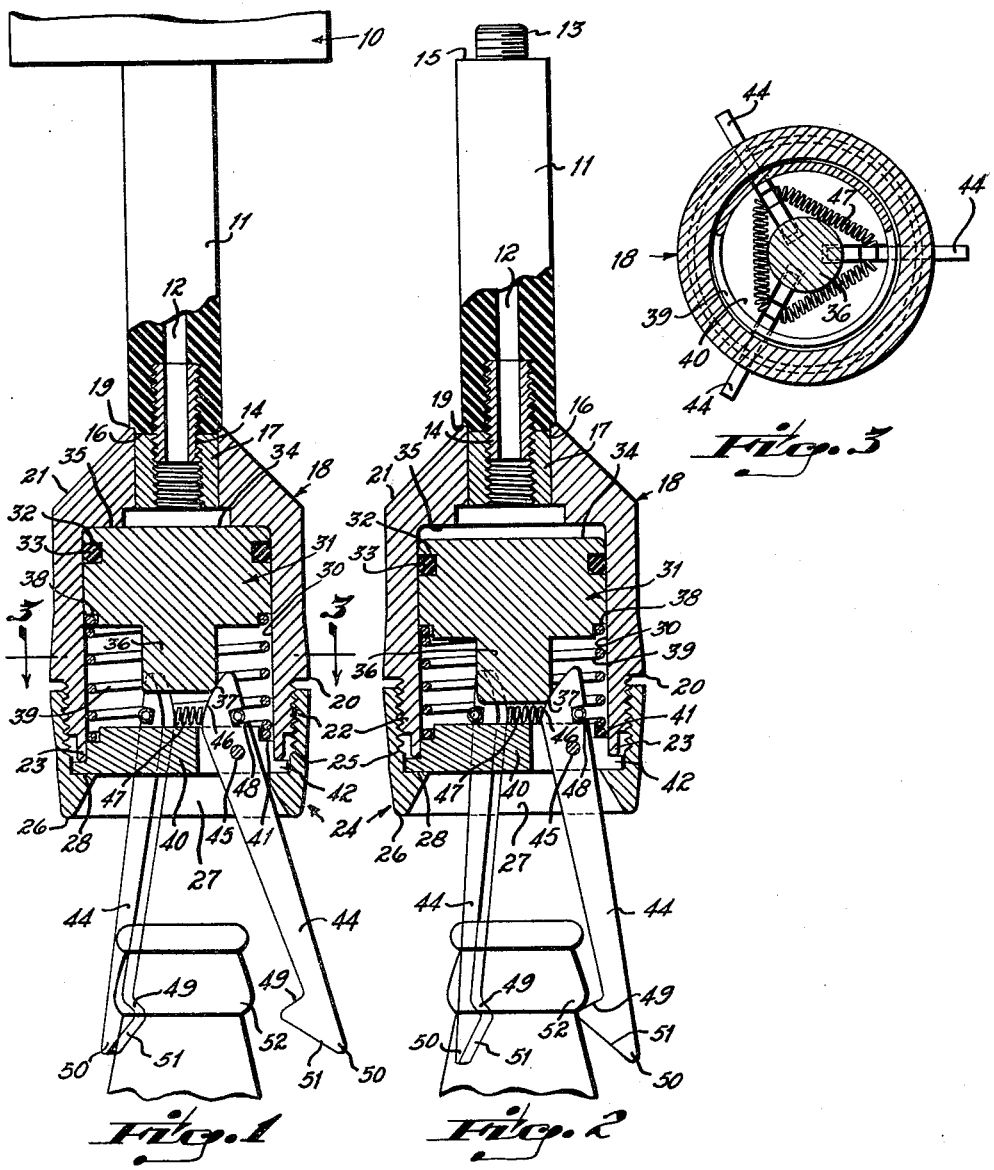
INVENTOR.
Edward F. Rowekamp
BY
Wood, Herron and Evans
ATTORNEYS

United States Patent Office 3,108,835
Patented Oct. 29, 1963

3,108,835
EXTERNALLY GRIPPING ARTICLE TRANSFERRING APPARATUS
Edward F. Rowekamp, Cincinnati, Ohio, assignor to The Lodge & Shipley Company, Cincinnati, Ohio, a corporation of Ohio
Filed Mar. 29, 1962, Ser. No. 183,491
3 Claims. (Cl. 294—88)

This invention relates to article transferring apparatus which is employed in the handling of containers, such as bottles, during loading and unloading operations in which the containers are removed from or are inserted into cartons or cases. It is the usual practice in operations of this sort to provide a gripping device for each bottle which is to be removed from or inserted into a carton. Thus, the gripping devices are arranged in gangs in the same pattern as the containers are arranged in the carton and all gripping devices operate simultaneously.

More specifically, the invention is directed to an adaptation of the lifting cup which is disclosed in U.S. Patent No. 2,873,996. The lifting cup of that patent comprises essentially a cylindrical shell having a bladder-like, circular gripper inside of it which is adapted to be engaged over the neck of a bottle. The cup or shell is suspended from an air pressure manifold head by means of a flexible hose. When the bladder is uninflated, its inner diameter is substantially larger than the neck of the bottle to be engaged. However, upon the application of air pressure, the bladder inflates which reduces its inner diameter and it thereby grasps the neck of the bottle.

The flexible hose which is employed to suspend the cup plays an important role in the successful operation of the patented device. The mouth of the cup flares and when the cup is lowered onto a bottle that is not aligned properly with it, the flexible hose permits the cup to shift, being guided by the flared mouth, which permits the misaligned bottle to be engaged and lifted. The engagement between the bladder and bottle is, of course, one in which the cup itself has to come down so that it surrounds the neck of the bottle. In certain types of operations, the cup cannot be brought down this far over a bottle. In other operations, due to the nature of the containers being operated upon, there is a likelihood that sharp edges will tear or cut the bladders and for this reason mechanical gripping fingers must be employed in place of the cups of the patent.

It has been an objective of this invention to provide an air operated lifting device which utilizes lifting fingers in place of a bladder, but which incorporates all of the desirable, self-aligning features of the patented lifting cup and to do this by using as many of the basic parts of the patented cup as possible in order to reduce costs and to have the advantage of interchangeability of parts between these two different types of lifting devices.

In a typical case unloading operation utilizing lifting cups of the patent, a machine is provided which is designed to unload, or uncase, three cases of bottles in one cycle. With each case containing twenty four bottles, seventy two individual lifting cups are required. These lifting cups are attached to a single head comprising an air pressure manifold. When air is applied to the manifold head, the bladders in all seventy two cups are inflated. The manifold head is carried by a relatively expensive machine which is designed to move the manifold head through a prescribed path in order to grasp all seventy two bottles, withdraw them from the three cases, then transport them to a conveyor and release them.

It may be appreciated that in the initial purchase of such a machine, the cups are relatively inexpensive considering the overall cost of the machine. In order to convert such a machine from inflatable bladder grippers to finger grippers, from a practical point of view it is necessary only to substitute the lifting device of this invention for the cups of the patent. This complete substitution of the lifting devices of this invention for the cups of the patent would be done where it is desirable to use the one basic machine for both types of operations. However, inasmuch as the basic parts of the lifting cup of the patent are retained in this lifting device, a permanent changeover from an inflatable bladder gripper to a finger gripper can be accomplished merely by substituting the internal parts of the present lifting device for the bladder and its associated parts of the patented lifting cup.

In the preferred embodiment, the lifting device of this invention utilizes the identical hose, the identical cup and the identical flared mouthpiece of the patented lifting device. The bladder is replaced by a piston, this piston fitting up inside the cup and being arranged so that it lowers against the force of a coil spring upon the application of air pressure to the hose. Containers, such as bottles, are lifted by means of three fingers which are normally spread apart, but upon lowering of the piston inside of the cup are moved toward one another so they come in contact with the outer surface of the container at three equally spaced places around it. Cam surfaces on the underside of the piston cause the closing movement of the fingers relative to one another. The piston is returned to its elevated position within the cup by means of the coil spring. The three fingers are pivotally mounted in a disc-like member which fits into the lower part of the cup being gripped and held in position by means of the mouthpiece of the cup, which, as shown in the patent, is adapted to be threaded into place on the cup itself. Only one other element is required, and this is a means to return the fingers from closed positions to spread positions, and in the preferred embodiment of this invention this means takes the form of an elongated coil spring which encircles and embraces the upper ends of all three of the fingers immediately above the disc-like member. The coil spring serves to draw the upper ends of the fingers in toward one another which, as a result of the pivots for the fingers, forces the lower or exposed ends of the fingers into relatively spread positions.

Other objectives and advantages of the invention will be readily apparent to those skilled in the art from the following detailed description of the drawings, in which:

FIGURE 1 is a cross sectional view through a lifting cup embodying the principles of the present invention. In this view the fingers are shown in spread condition.

FIGURE 2 is a view similar to FIGURE 1 showing the fingers in bottle gripping positions.

FIGURE 3 is a cross sectional view taken on the line 3—3 of FIGURE 1.

FIGURE 4 is a bottom plan view of the lifting device shown with the fingers spread.

FIGURE 5 is a view similar to FIGURE 4 showing the fingers in relatively closed positions.

A small portion only of an air pressure manifold head is indicated at 10. A rubber hose 11 is shown attached to manifold head 10, and the hose has an internal passageway 12 to deliver air under pressure from head 10. Two threaded brass nipples 13 and 14 project from the opposite ends of the rubber hose. Preferably these bushings are threaded from one end to the other and they are molded directly into the rubber hose. The opposite ends of the hose are flat to provide two annular areas 15 and 16 surrounding the projecting ends of nipples 13 and 14. These areas provide seals when the nipples are threaded into the manifold 10 at the one end and into a bushing 17 at the opposite end. Bushing 17 is molded into a cup, or shell, designated generally by 18, so that it becomes an integral part thereof. The upper end of the cup 18 is configurated to provide a circular ridge 19 which, when the hose is threaded into bushing 17, serves as an auxiliary seal for the lower end of the hose.

Cup 18 is generally cylindrical in the lower portion 20, however, the upper end of the cup designated 21 is in the shape of a frustum of a cone. Adjacent to the lower end of cup 18 the cylindrical portion 20 is of reduced diameter and it is threaded as shown at 22. The very lower edge of the cup is of even greater reduced diameter to provide a rim 23 of narrow proportions. The lower end of the cup is enclosed by means of a mouthpiece designated generally by the numeral 24. This mouthpiece is generally in the form of a hollow cylinder and it has internal threads at 25 which engage threads 22 on cup 18. The bottom rim of mouthpiece 24 is rounded as shown at 26 and the internal wall of the mouthpiece tapers inwardly from the rounded lower edge 26 to provide a throat 27 which, looking at it the other way, flares outwardly. A shelf 28 is provided internally of the flared part of the mouthpiece, this shelf being in a horizontal plane and comprises a seat.

The parts of the lifting device of this invention which have been described to this point are identical with corresponding parts of the patented lifting cup. Also, as in the patented lifting device, the cup 18 is hollow internally to provide in this case a cylinder, the wall of which is designated 30, which receives a piston designated generally by the numeral 31. A somewhat loose slip-fit is provided between the wall of the piston and the internal wall of the cylinder 30. In order to provide a seal, the piston is a peripheral groove 32 in its wall adjacent to the upper end thereof, this groove receiving an O-ring 33. In order that there be no binding between the O-ring and the cylinder wall, it is preferred that the lifting device be lubricated at the time of initial assembly by applying a film of grease to the inside of the cylinder, this grease being selected from a group of greases which does not adversely effect rubber. The top of the piston is designated 34 and it is flat. In its elevated position the top of the piston engages an annular area designated 35 which surrounds the entrance for air from the hose into the top of the cylinder. The underside of the piston has a cylindrical plug 36 which is centered thereon and which depends from the piston proper. The lower edge of the plug is rounded slightly as shown at 37 and this rounded edge provides a cam surface as will be explained below. The outer marginal area of the underside of the piston is configurated as shown at 38 to receive the upper end of a coil spring 39. The opposite end of this coil spring is supported upon a disc 40 which resides within the lower end of the cup. The upper part of disc 40 is stepped to provide a seat 41 for the lower end of coil spring 39 and a seat 42 which is engaged under the rounded lower edge 23 of the cup itself and is seated upon the shelf 28 of the mouthpiece 24. By threading the mouthpiece onto the cup the extreme outer marginal edge of the disc beneath the seat 42 is squeezed between the cup and mouthpiece and is thereby locked into position.

The disc has three radial slots cut in it which extend from positions adjacent to the center of the disc through the outer edge of the disc. These slots are symmetrically spaced with respect to the center of the disc and they receive three gripper fingers designated 44 in each instance. The fingers are pivotally mounted in the slots on pins designated 45 which pass horizontally through the fingers within the slots. The mounting thus provided permits the lower ends of the fingers to swing toward and away from one another in radial planes. The upper ends of the fingers above the pivot pins 45 project up into the cup past the lower end of the plug 36. The tops of the pins are rounded off as at 46 to present cam surfaces to the lower edge of the plug. The upper ends of the pins normally are held against the plug by means of a coil spring 47 which embraces all three of the pins immediately above the disc 40, the coil spring being engaged within a notch 48 in each of the fingers along its outer edge. The portion of each finger below the pivot pin 45 is substantially longer than the portion above the pin 45. The lower ends of the fingers are configurated in each instance, to provide a substantially right angularly arranged shoulder 49, a pointed lower end 50 and a slanting guide surface 51 which joins the outer edge of the shoulder and the point end 50. In the preferred embodiment of the invention the fingers are so proportioned relative to one another and to their pivots so that they are spread apart considerably farther than the diameter of the top of a bottle to be engaged. In this way the slanting surface 51 on each of the pins provides a guide which preserves the self-aligning feature of the patented cup. When a bottle is misaligned with the vertical axis of the lifting cup the engagement of a slanting surface 51 serves to shift the cup so that it swings into a position of alignment with respect to the bottle. Upon the application of air pressure to the cylinder the piston is depressed and this cams the three fingers in toward one another so that the shoulders 49 may engage underneath of the neck bulge which in FIGURES 1 and 2 is designated by the number 52. With the fingers engaged underneath these neck crowns the bottles may then be lifted from a carton, transported to a position of deposit and then released, the release being brought about by the exhaustion of air pressure within the cylinder, the return of the piston to an elevated position under the action of coil spring 39 and a spreading of the fingers under the action of the coil spring 47 which surrounds the fingers above the pivot pins 45.

For the purposes of this disclosure it has been assumed that the lifting device is being used in an uncasing operation. However, it will be obvious to those skilled in the art that it may also be utilized for a casing operation with no change.

Having described my invention, I claim:

1. A device for use with article transferring apparatus to engage and lift bottles comprising:
    a shell having a hollow interior to provide a cylinder which is open at the bottom, the lower portion of said shell having external screw threads thereon,
    a flexible hose connected to the top of said shell and providing passageway for air under pressure to the top of said cylinder, a piston in said cylinder adapted to move downwardly upon the application of air under pressure to the top of said cylinder,
    a cylindrical plug centered on the underside of said piston the lower edge of which provides cam surfaces,
    a mouthpiece having internal screw threads engaging the external screw threads on the lower end of said shell and presenting an annular shelf toward the bottom of said shell,
    a disc seated on said annular shelf and held against the lower end of said shell by said mouthpiece,
    a coil spring having its upper end in contact with the bottom of said piston surrounding said cylindrical plug and having its lower end in contact with said disc and being adapted to compress upon the application of air under pressure to the cylinder and to expand to move the piston upwardly upon the release of said air under pressure,
    at least three elongated fingers, means to pivotally mount said fingers in radial slots in said disc for swinging movement of their lower ends toward and away from one another in radial planes,
    the ends of said fingers above said disc having cam surfaces thereon adapted to be contacted by the cam surfaces on said cylindrical plug upon downward movement of said piston to swing the lower ends of said fingers toward one another and into contact with the neck of a bottle over which the device is suspended, and a coil spring wrapped around all three fingers above said disc to normally urge the upper ends of said fingers toward one another, whereby the lower ends are urged away from one another into bottle releasing positions.

2. A device for use with article transferring apparatus to engage and lift open mouthed containers comprising:

a shell having a hollow interior to provide a cylinder which is open at the bottom, the lower portion of said shell having external screw threads thereon, a flexible hose connected to the top of said shell and providing passageway for air under pressure to the top of said cylinder, a piston in said cylinder adapted to move downwardly upon the application of air under pressure to the top of said cylinder, means on the underside of said piston providing cam surfaces, spring means within said shell normally urging said piston toward an elevated position within said cylinder, a mouthpiece having internal screw threads engaging the external screw threads on the lower end of said shell and presenting an annular shelf toward the bottom of said shell, a disc seated on said annular shelf and held against the lower end of said shell by said mouthpiece, said disc assembly having at least three radial slots therein, at least three elongated fingers pivotally mounted within said slots for swinging movement of their lower ends toward and away from one another in radial planes which are common to the vertical central axis of said cylinder, the ends of said fingers above said disc having cam surfaces thereon adapted to be contacted by the cam surfaces on the underside of said piston upon downward movement of said piston to swing the lower ends of said fingers toward one another and into contact with the neck of a bottle over which the device is suspended, and spring means within said shell normally urging the upper ends of the fingers toward one another to spread the lower ends of the fingers into bottle releasing positions.

3. A device for use with article transferring apparatus to engage and lift open mouthed containers comprising:

a shell having a hollow interior to provide a cylinder which is open at the bottom, the lower portion of said shell having external screw threads thereon, a flexible hose connected to the top of said shell and providing passageway for air under pressure to the top of said cylinder, a piston in said cylinder adapted to move downwardly upon the application of air under pressure to the top of said cylinder, means on the underside of said piston providing cam surfaces, spring means within said shell normally urging said piston toward an elevated position within the cylinder, a mouthpiece having internal screw threads engaging the external screw threads on the lower end of said shell and presenting an annular shelf toward the bottom of said shell, a disc seated on said annular shelf and held against the lower end of said shell by said mouthpiece, three elongated bottle gripping fingers, means to pivotally mount said fingers in said disc for swinging movement of their lower ends toward and away from one another in radial planes which are common to the vertical central axis of said cylinder, the ends of said fingers above said disc having cam surfaces thereon adapted to be contacted by the cam surfaces on the underside of said piston upon downward movement of said piston to swing the lower ends of said fingers toward one another and into contact with the neck of a bottle over which the device is suspended, and spring means normally urging said fingers toward positions in which their lower ends are spread into bottle releasing positions.

References Cited in the file of this patent
UNITED STATES PATENTS

| | | |
|---|---|---|
| 1,747,606 | Steiner | Feb. 18, 1930 |
| 2,863,579 | Meyer | Dec. 9, 1958 |